Oct. 31, 1967    C. J. MAURER ETAL    3,349,924
STORAGE DEVICE FOR ARTICLES AND METHOD
Filed Dec. 6, 1965    3 Sheets-Sheet 2

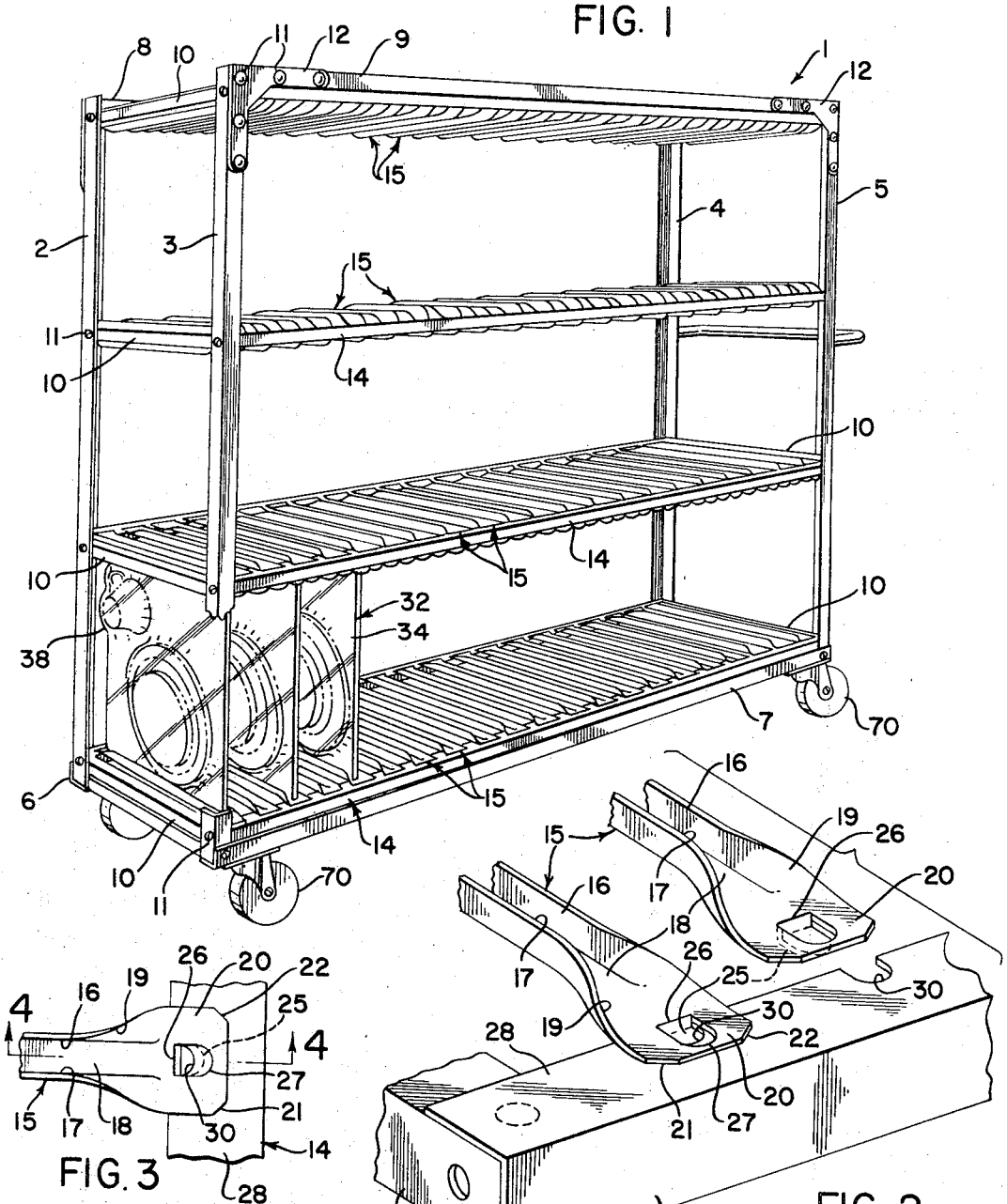

INVENTORS.
CHARLES J. MAURER &
ROBERT S. MONTGOMERY
BY
Fay & Fay
ATTORNEYS

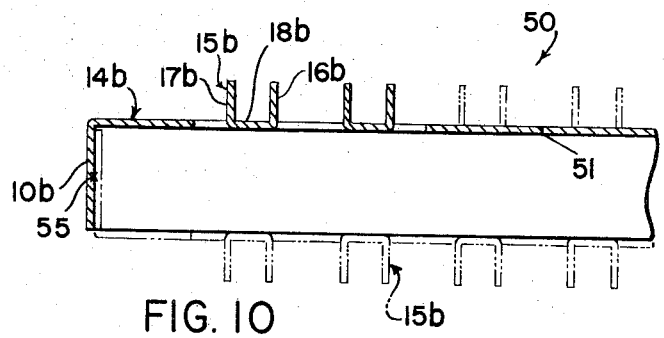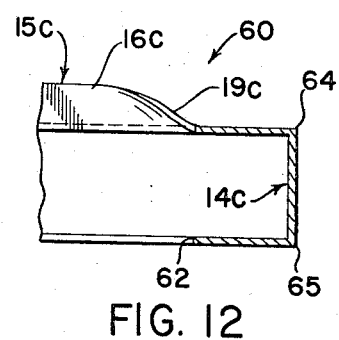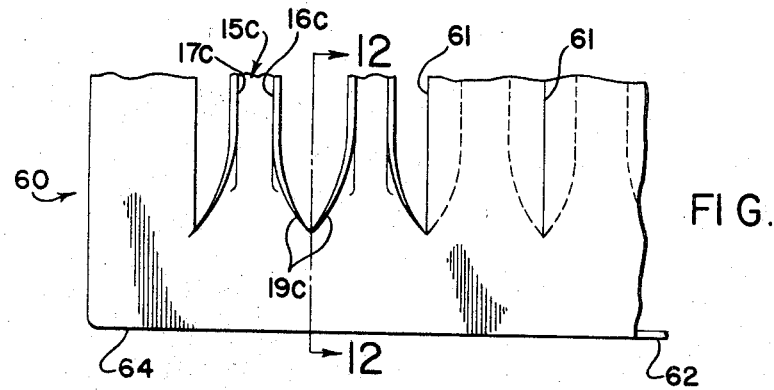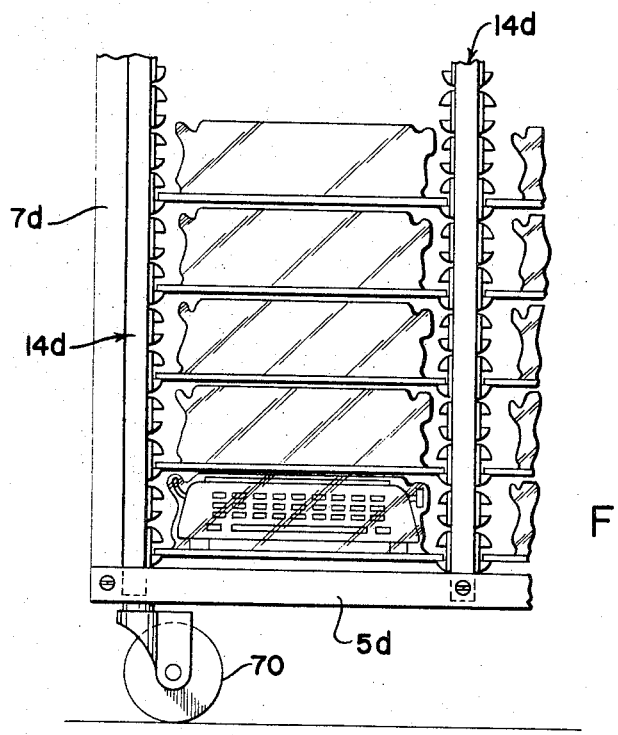

United States Patent Office 3,349,924
Patented Oct. 31, 1967

3,349,924
STORAGE DEVICE FOR ARTICLES AND METHOD
Charles J. Maurer, Bay Village, and Robert S. Montgomery, Parma, Ohio, assignors to American Handling Equipment Company, Cleveland, Ohio, a corporation of Michigan
Filed Dec. 6, 1965, Ser. No. 511,618
4 Claims. (Cl. 211—177)

ABSTRACT OF THE DISCLOSURE

The disclosed storage device comprises a frame of rigidly interconnected metal members which includes pairs of spaced upright support members to which are attached pairs of spaced horizontal parallel elongated support members. Sets of parallel flared end channel shaped tracks are provided to interconnect each support member of a pair with the other support member of its pair by means of integral tabs projecting outwardly away from the surface from which they were cut and deformed. Each set of tracks is oriented to present its channel openings in opposing spaced relation to corresponding channel openings of a set of tracks interconnecting an adjacent pair of support members. A plurality of flat rigid panels having flat opposite sides and a thickness that will permit them to be disposed edgewise in the track channels is provided with a plastic film, or other pocket forming means such as mechanically secured bands, secured thereto to hold one of the three-dimensional articles to be stored on one side of each panel.

Specification

This invention relates to a novel storage device for three-dimensional articles of various sizes and shapes and methods of using and making said device. The invention is particularly adapted for the efficient storage of articles in a manner which requires a minimum of space and a minimum of expense with extremely easy insertion and retrieval of the stored articles. The invention also relates to a novel and inexpensive method of producing the novel storage device.

The storage device of the invention may be utilized to store sets of dishes, tools, toys, typewriters, and a variety of other three-dimensional articles of various sizes and shapes which are required to be stocked in volume, for instance, by wholesale or retail merchants.

The storage device of the present invention comprises a frame of rigidly interconnected metal members which includes pairs of spaced parallel elongated support members. Sets of parallel flared end channel shaped tracks are provided to interconnect each support member of a pair with the other support member of its pair. Each set of tracks is oriented to present its channel openings in opposing spaced relation to corresponding channel openings of a set of tracks interconnecting an adjacent pair of support members. These sets are such that individual channels of each set of tracks is in opposing spaced parallel relation to the corresponding individual channels of an adjacent set of tracks.

A plurality of rigid panels having flat opposite sides and a thickness that will permit them to be disposed edgewise in the track channels is provided with a plastic film, or other pocket forming means such as mechanically secured bands, secured thereto to hold one of the three-dimensional articles to be stored on one side of each panel. The flared ends of the channels, of course, provide for easy insertion of the panels to complete the storage device.

The panel subassemblies may be made up with the articles already secured thereon by techniques such as "skin packaging" or "blister packaging" or they may be provided with mechanically secured members forming open pockets projecting from the panel sides for selective article insertion.

The tracks of the storage device may be secured to the pairs of support members by integral tabs thereon, or the pairs of support members and tracks may be made from the unitary metal sheets by novel selective slitting and bending operations.

It is a feature of the storage device of the invention that it may be mounted on casters for mobility to the desired work areas from a storage area.

Thus, it will be readily seen that the instant invention provides a device and methods which will simplify the storage of articles by retail and other establishments by providing a storage device utilizing a high percentage of its available volume with easy insertion and retrieval of the articles therefrom by sliding movement of discardable shelves. Moreover, it will be apparent that with the instant invention it will be possible for manufacturers to make up subassemblies by placing the articles on the discardable shelves so that a warehouser or retailer can efficiently store the goods by sliding the shelves in the tracks of the storage device. Also, the novel device and storing procedure of the instant invention permits the elimination of the operations of stacking and restacking stored articles during storage and retrieval. These time-consuming operations are particularly difficult with fragile irregularly shaped articles on prior art shelves unless space consuming elaborate protective packaging is provided.

In addition, it will be noted that by eliminating the necessity of space-consuming protective packaging of fragile irregularly shaped articles, significant labor time for unpacking of the goods at the wholesale or retail establishment can be eliminated.

Accordingly, it is an object of the invention to provide a storage device for articles which is extremely efficient from a space-saving and labor-saving standpoint, particularly when used in storing fragile articles of irregular shape.

It is a further object of the invention to provide an extremely efficient method of storing a plurality of articles which provides ready access to the stored articles without having to handle or rearrange any more of the articles than are desired to be retrieved.

It is a further object of the invention to provide a method of manufacturing the storage device of the invention in an extremely efficient manner which requires a minimum of elaborate equipment and elaborate and expensive operations.

Other and more specific objects of the invention will be apparent from the drawings and the detailed description to follow.

In the drawings:

FIG. 1 is a perspective view of the storage device constructed according to the invention.

FIG. 2 is a detailed fragmentary perspective view illustrating one method of assembling the tracks to the support members in constructing the storage device of FIG. 1.

FIG. 3 is a plan view of one of the joints of FIG. 2.

FIG. 4 is a cross-sectional view along the line 4—4 of FIG. 3.

FIG. 10 is a fragmentary cross-sectional view along the line 10—10 of FIG. 9.

FIG. 11 is a plan view of a slightly different embodiment of the subassembly of FIG. 9.

FIG. 12 is a fragmentary cross-sectional view along the line 12—12 of FIG. 11.

FIG. 13 is a fragmentary elevational view of a slightly different embodiment of the device of FIG. 1.

Figure 5:
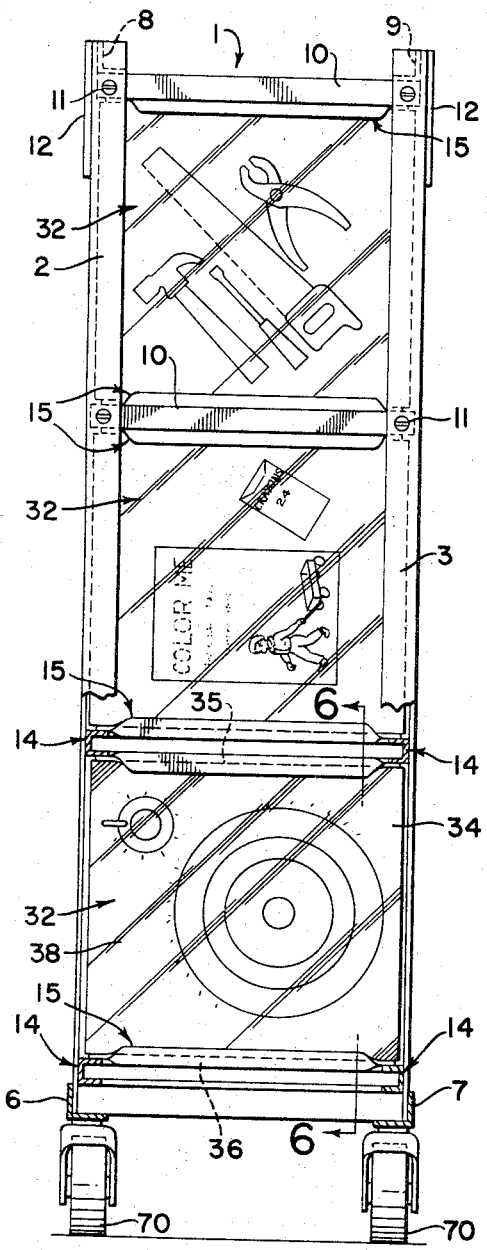
FIG. 5 is an end elevational view of the device of FIG. 1 fully loaded.
Figure 6:
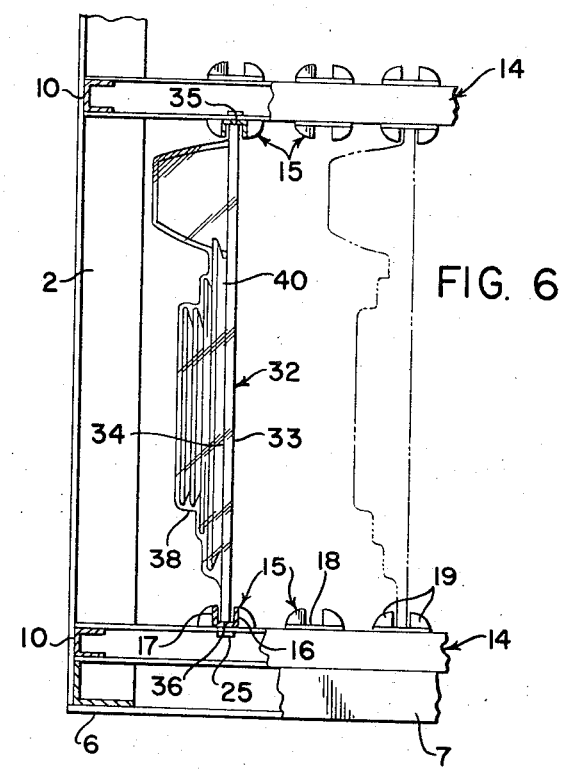
FIG. 6 is a fragmentary cross-sectional view along the line 6—6 of FIG. 5.

In the drawings the numeral 1 generally designates the storage device of the invention as illustrated in FIG. 1, for instance. The device 1 comprises an elongated frame having a pair of parallel upright support members 2 and 3 at one end and another pair 4 and 5 at the opposite end. The members 2, 3, 4 and 5 are of elongated angular material and are connected by a lower base comprising bottom elongated angular frame members 6 and 7 and top elongated angular frame members 8 and 9 extending parallelly in a lengthwise direction of the device. The corner members 2, 3, 4, and 5 are also interconnected by a plurality of channel shaped members 10. The members 10 interconnect each pair of upstanding corner members such that they lie between angle members 2 and 3 on one end at a plurality of spaced locations and between corner members 4 and 5 at the opposite end in a plurality of corresponding locations.

Fastening means 11 such as bolts or rivets are utilized to hold the various frame members thus far described together with corner gussets or reinforcements 12 insuring rigidity of the inter-fitted channeled and angled members of the frame. Pairs of spaced parallel elongated channel shaped support members 14 are provided such that they are secured to the interconnecting members 10 to define with them a plurality of rectangular frame like structures with corresponding parallel members 10 at opposite ends of the elongated frame.

Sets of parallel flared end channel shaped tracks 15 interconnect each support member 14 with the other support member 14 of its pair in transverse perpendicular spanning relationship thereto. Each individual track 15 has a pair of channel defining walls 16 and 17 interconnected by base portion or channel bottom 18. The channel defining walls 16 and 17 of the track 15 flare outwardly as at 19 to form a flat end portion 20 which lies substantially in the plane of the base 18 of the track channel defined by the walls 16 and 17. The outer corners 21 and 22 form angled edges of the end portion 20 at approximately 45° to the longitudinal edges of said support members 14 and said tracks 15 and approximately 90° to each other.

The tracks 15 are maintained in their spanning relationship to the support members, in the embodiment illustrated in FIGS. 2 through 4, by means of integral tabs 25 in the end portions 20. The integral tabs 25 are connected to the end portions 20 by means of a tab base portion 26 and are formed by severing the end portions 20 along a U-shaped line 27 so that free ends of the tabs 25 face in the direction of their corresponding adjacent support member 14 when formed downwardly out of the plane of the flat end portions 20 of the track 15. The support members 14 have channel defining legs 28 and 29 respectively and a plurality of regularly spaced notches 30 through the edges of the channel defining legs 28 and 29 such that the integral tabs 25 project through the notches 30 and extend into the channels defined by the legs 28 and 29 of the support members 14 against the inner sides of the channel defining legs inward of the notches 30 to secure the tracks 15 to the support members 14.

Figure 7:
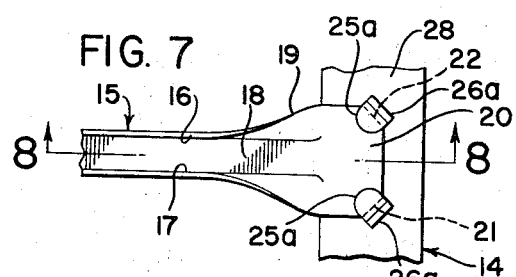
FIG. 7 is a view similar to FIG. 3 of a slightly different embodiment of the invention.
Figure 8:
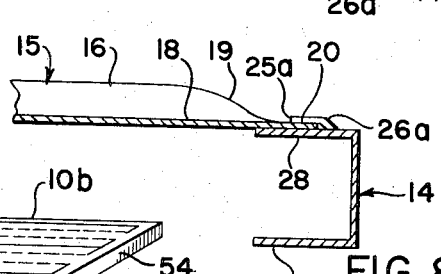
FIG. 8 is a cross-sectional view along line 8—8 of FIG. 7.

In the embodiment illustrated in FIGS. 7 and 8, the track members 15 are provided with a flat end portion 20 and angled corners 21 and 22 but without the integral tabs 25 provided thereon. In this embodiment tabs 25a are provided on the channel defining legs 28 and 29 of the support members 14 with integral base portions 26a thereon angled at approximately 45° to the longitudinal edges of the support members 14 and 90° to each other for close engagement with the angled corners 21 and 22 of the tracks 15 such that the tabs extend over and around the angled edges 21 and 22 onto the surface of the flattened end portion 20 of the track 15 to secure the tracks thereto. In this arrangement, it is not necessary for notches 30 to be provided in the channel shaped support members 14.

Whichever of the methods of attaching and interconnecting the tracks 15 to their respective pairs of support members 14 is utilized, the set of tracks 15 of each pair of support members 14 is oriented to present its channel openings in opposing spaced relation to the corresponding channel openings of a set of tracks interconnecting an adjacent pair of support members 14. Accordingly, the individual channels of each set of the tracks 15 are in opposing spaced parallel relationship to the corresponding individual channels of an adjacent set of tracks.

The individual pairs of support members 14 and their associated connecting frame members 10 may be made up in modules before being attached to the rigid structure formed by the corner support members 2, 3, 4, and 5 and their longitudinal supports 6, 7, 8 and 9 by providing each pair of supports with two sets of tracks 15, each facing in a direction opposite the other. Only one set of tracks 15 will be necessary for the pair of support members 14 which are disposed at the ends of the corner supports 2, 3, 4, and 5.

In the storage device of the invention, the articles to be stored do not actually come in contact with the frame, the support members or the tracks, because a plurality of rigid panels 32 having opposite flat sides 33 and 34 and a thickness less than the width of the channels 18 are provided for holding the articles. The panels 32 are of a shape having substantially parallel opposite edges 35 and 36 which are spaced from each other by a distance greater than the distance from one track 15 to its opposing corresponding track 15 but less than the distance from the base of the channel 18 of one track to the base of the channel 18 of the opposing track.

The panels 32 have a means secured thereon, which in the illustrated embodiment is a plastic film 38, defining with the sides 34 of the panels 32 article storage pockets 40 projecting outwardly from the sides 34. Other means of forming the pockets 40 such as strips of plastic stapled to the sides 34 or elastic bands attached thereto may be used instead of the plastic film 34, if desired.

Figure 9:
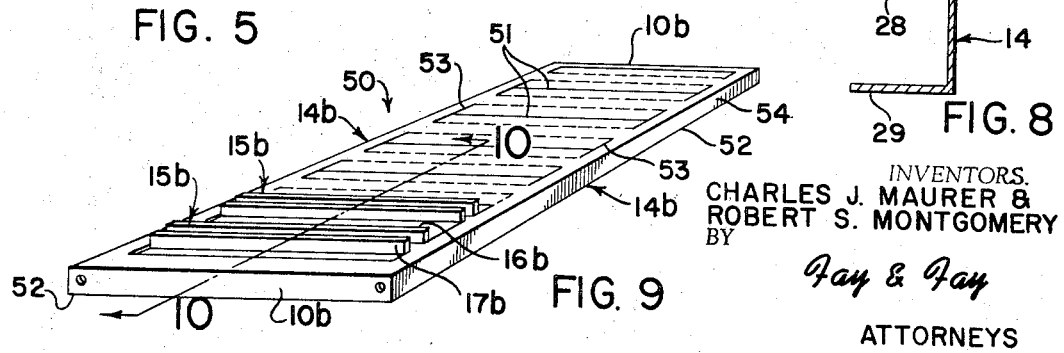
FIG. 9 is a perspective view of a subassembly of a slightly different embodiment of the device of FIG. 1.

FIG. 9 illustrates an intermediate stage of manufacturing of a pair of spaced metal support members 14b interconnected by integral side support members 10b and integral tracks 15. A sheet of metal generally designated by the numeral 50 is laid out and slit along a plurality of transverse equally spaced lines 51 of equal length. The ends of the lines 51 are equally spaced from longitudinal edges 52 of the sheet 50.

The sheet 50 is also slit along a plurality of spaced shorter lines 53 perpendicular to the lines 51 at the ends thereof and lieing in opposite directions from the ends of the lines 51 for an equal distance which is less than half the distance to the adjacent lines 51. The lines 51 and 53 then define a plurality of flaps or edges of metal which can be bent at right angles to the sheet 51 along a line between the ends of their respective lines 53 and parallel to lines 51 such that a plurality of channel defining walls 16b and 17b are provided interconnecting the parallel support members 14b.

The support members 14b are provided by bending the sheets in the marginal areas disposed between the edges 52 and the lines 51 along a straight line. Two of the modules formed from sheets 50, as illustrated in FIG. 9, are placed with the flanges 54 of one sheet in face-to-face engagement with the flanges 54 of the other sheet such that the channels of the sets of tracks 15b face in opposite directions. The flanges 54 are then welded such as at 55 to provide a pair of support members 14b.

Thus, it will be seen that the two sheets 50 had been formed into a pair of spaced metal support members 14b having two sets of elongated metal tracks 15b. The ends of the channel defining walls 16b and 17b are then bent to flare them as previously described and the entire module may be placed in the rigid structure formed by the corner support members 2, 3, 4, and 5 and their longitudinal supports 6, 7, 8, and 9 by welding or bolting them in place.

An alternative manner of constructing a module from two single sheets of metal 60 is shown in FIGS. 11 and 12. A plurality of parallel equally spaced slit lines 61 of equal length with the ends of the lines equally spaced from the longitudinal edges 62 of the sheets are provided and the edges 61 of the slits are bent over the major intermediate portion thereof to project at right angles to the plane of sheets 60. These bent edges define tracks 15c with channel defining walls 16c and 17c with flared portions 19c integrally in the sheets 60. The marginal areas disposed between the edges 62 of the sheets and the ends of the slits 61 are bent as at 64 at substantially right angles to the sheets to permit their nesting with each other in a manner shown in connection with the module made from sheets 50 in FIG. 10.

A single sheet 50 or sheet 60 may be used as an endmost set of tracks in which case a bend 65 is also provided to form a stiffened channel shape parallel support for location at the end of the corner members 2, 3, 4, and 5 of the rigid frame member. Accordingly, it will be seen that the modules of pairs of parallel support members and sets of tracks 15 interconnecting them may be constructed in any of the illustrated and described manners with each one having the ability to provide the novel storage device of the invention in an expedient manner adapted to be mass produced.

FIG. 13 illustrates an alternative form of the storage device of the invention where it is desired that the rigid panels be oriented in a horizontal plane rather than a vertical plane. In this embodiment, the pairs of parallel support members 14d and the corner members 3d, etc. are all oriented exactly 90° from that shown in the embodiment illustrated in FIG. 1. The construction of the pairs of supports 14 and sets of tracks 15 associated therewith and the rigid frame comprising the corner members 2, 3, 4, and 5 and the interconnecting frame members 6, 7, 8, and 9, however, need not be varied to produce this embodiment of FIG. 13.

The storage devices illustrated in either FIG. 1 or 13 may be provided on casters 70 in conventional manner if this is desired. It has been found extremely suitable to provide these casters since they permit moving of the storage devices manually and, therefore, provide greater flexibility of material handling, particularly in a retail or wholesale establishment. It is also contemplated, however, that the storage device constructed according to the invention could be mounted directly on the floor with its rigid frame resting directly on the supporting surface without the use of casters.

For ease of description, the principles of the invention have been set forth in connection with but a single illustrated embodiment thereof. It is not our intention, however, that the illustrated embodiment nor the terminology employed in describing it be limiting inasmuch as variations may be made without departing from the spirit of the invention. Rather, we desire to be restricted only by the scope of the appended claims.

We claim:

1. A storage device for articles comprising in combination:
   a metal frame of rigidly interconnected elongated members which includes pairs of spaced upright support members to which are attached pairs of spaced horizontal parallel elongated support members,
   sets of parallel flared end channel shaped metal tracks interconnecting each support member of a pair with the other support member of its pair,
   each set of tracks being oriented to present the channel openings of at least a portion of said set in opposing spaced relation to corresponding channel openings of a set interconnecting a pair of support members adjacent said one pair such that individual channels of each set of tracks are secured in opposing spaced parallel relation to the corresponding individual channels of an adjacent set of tracks by means of integral tabs projecting outwardly away from the surface from which they were cut and deformed,
   a plurality of rigid panels each having opposite flat sides and a thickness less than the width of said channels and substantially parallel opposite edges spaced from each other by a distance greater than the distance from one track to its opposing corresponding track but less than the distance from the bottom of one track channel to the bottom of the opposing corresponding track channel,
   said panels each having a means secured thereto to define with one of said flat sides an article storage pocket which projects outwardly from said one side, whereby an article stored in said pocket may be retrieved by sliding said panel's opposite edges along the tracks and out of the track channels in which they are disposed, removing said article from said pocket and discarding said panel.

2. The storage device of claim 1 in which the support members are made of channel shaped metal members having a plurality of regularly spaced notches through the edges of the two channel defining legs of said channel shaped members and said tracks interconnecting said support members are metal members having integral tabs adjacent their ends projecting through said notches and extending into the channels of said support members and against the inner sides of the channel defining legs to secure said tracks to said support members.

3. A storage device for articles comprising in combination:
   a frame of rigidly interconnected elongated members which includes pairs of spaced parallel elongated support members,
   sets of parallel flared end channel shaped tracks interconnecting each support member of a pair with the other support member of its pair,
   each set of tracks being oriented to present the channel openings of at least a portion of said set in opposing spaced relation to corresponding channel openings of a set of tracks interconnecting a pair of support members adjacent said one pair such that individual channels of each set of tracks are in opposing spaced parallel relation to the corresponding individual channels of an adjacent set of tracks,
   said support members being made of metal channel shaped members having a plurality of regularly spaced pairs of outwardly projecting integral tabs having base portions which connect them to the channel defining legs of said support members angled at approximately 45° to the longitudinal edges of said support members and 90° to each other, and said tracks interconnecting said support members having their respective flared channel defining walls merging at the ends thereof with the bottoms of their respective channels to form substantially flat end portions thereof,
   said end portions having edges angled at approximately 45° to the longitudinal edges of said support members and approximately 90° to each other for close engagement with the base portions of said integral tabs, said tabs extending over and around said angled edges to secure said tracks thereto.
   a plurality of rigid panels each having opposite flat sides and a thickness less than the width of said channels and substantially parallel opposite edges spaced from each other by a distance greater than the distance from one track to its opposing corresponding track but less than the distance from the bottom of one track channel to the bottom of the opposing corresponding track channel, said panels each having a means secured thereto to define with one of said flat sides an article storage pocket which projects outwardly from said one side, whereby an article stored in said pocket may be retrieved by sliding said panels opposite edges along the tracks and out of the track channels in which they are disposed, removing said article from said pocket and discarding said panel.

4. A storage device for articles comprising in combination:

a frame of rigidly interconnected elongated members which includes pairs of spaced parallel elongated support members, sets of parallel flared end channel shaped tracks interconnecting each support member of a pair with the other support member of its pair, each set of tracks being oriented to present the channel openings of at least a portion of said set in opposing spaced relation to corresponding channel openings of a set interconnecting a pair of support members adjacent said one pair such that individual channels of each set of tracks are in opposing spaced parallel relation to the corresponding individual channels of an adjacent set of tracks, each set of tracks being integral wtih halves of the support members which they interconnect such that they define single integral metal structural members which can be secured in pairs in back to back relation to define two support members interconnected by two sets of tracks having flared end channels opening in opposite directions, a plurality of rigid panels each having opposite flat sides and a thickness less than the width of said channels and substantially parallel opposite edges spaced from each other by a distance greater than the distance from one track to its opposing corresponding track but less than the distance from the bottom of one track channel to the bottom of the opposing corresponding track channel, said panels each having a means secured thereto to define with one of said flat sides an article storage pocket which projects outwardly from said one side, whereby an article stored in said pocket may be retrieved by sliding said panel's opposite edges along the tracks and out of the track channels in which they are disposed, removing said article from said pocket and discarding said panel.

References Cited

UNITED STATES PATENTS

| 1,046,488 | 12/1912 | Pauley | 108—61 |
| 1,623,244 | 4/1927 | Hooper | 211—36 |
| 1,711,329 | 4/1929 | Short | 211—135 |
| 1,854,777 | 4/1932 | Bales | 211—126 |
| 2,986,281 | 5/1961 | Jordan | 211—41 |
| 3,016,148 | 1/1962 | Riddle | 211—41 |
| 3,255,880 | 6/1966 | Grossman | 206—78 |

ROY D. FRAZIER, *Primary Examiner.*

W. D. LOULAN, *Assistant Examiner.*